United States Patent [19]

Scharbach et al.

[11] 4,146,865
[45] Mar. 27, 1979

[54] TEMPERATURE MEASURING DEVICE FOR ENAMELED EQUIPMENT

[75] Inventors: Heinz Scharbach, Plankstadt; Hans R. Trampert, Oftersheim, both of Fed. Rep. of Germany

[73] Assignee: Pfaudler-Werke A.G., Schwetzingen, Fed. Rep. of Germany

[21] Appl. No.: 903,863

[22] Filed: May 8, 1978

[30] Foreign Application Priority Data

May 28, 1977 [DE] Fed. Rep. of Germany ....... 2724265

[51] Int. Cl.² .............................................. H01C 3/04
[52] U.S. Cl. ...................................... 338/28; 338/229
[58] Field of Search .......................... 338/25, 28, 229; 73/362 AR; 29/612

[56] References Cited

U.S. PATENT DOCUMENTS

| 834,162 | 10/1906 | Northrup | 338/28 |
|---|---|---|---|
| 1,490,990 | 4/1924 | Taylor | 73/362 AR |
| 2,120,335 | 6/1938 | Lederer | 338/10 |
| 3,563,808 | 2/1971 | Scharbach et al. | 136/230 |
| 3,830,105 | 8/1974 | Horsch | 73/362 AR |

FOREIGN PATENT DOCUMENTS 434635  9/1935  United Kingdom ...................... 338/28

*Primary Examiner*—C. L. Albritton
*Attorney, Agent, or Firm*—Theodore B. Roessel; J. Stephen Yeo

[57] ABSTRACT

An enameled steel cone is the support for a heat sensitive resistor element. The resistive element is arranged upon the enameled base of the cone and with a layer of enamel. A hollow shaft extends from the apex of the cone. Wires connected to the resistive element are fed through the body of the cone and through the hollow shaft. The assembly may be enameled in place or otherwise secured to a prepared structure such as a enameled steel vessel or member.

6 Claims, 1 Drawing Figure

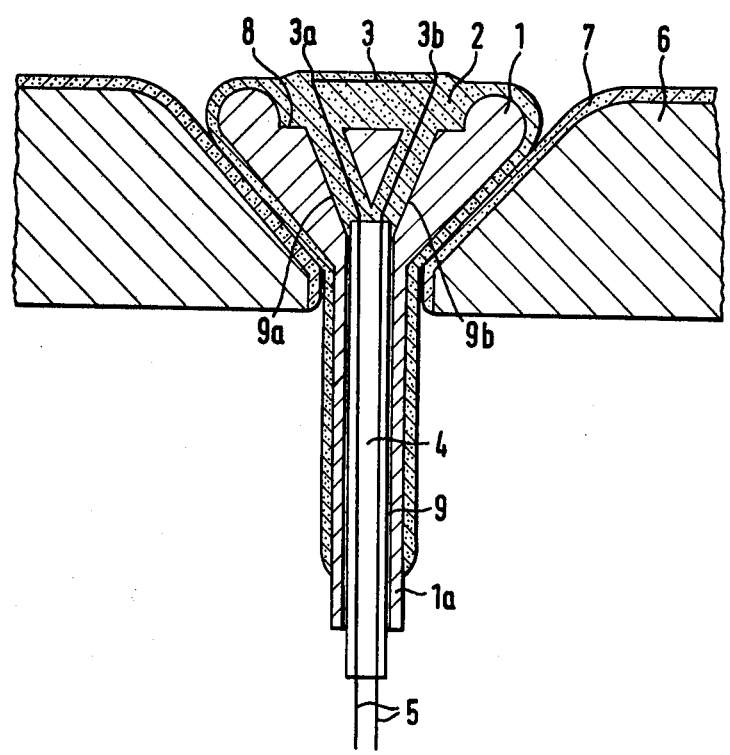

TEMPERATURE MEASURING DEVICE FOR ENAMELED EQUIPMENT

BACKGROUND OF THE INVENTION

This invention concerns a temperature measuring device for enameled equipment.

In U.S. Pat. No. 3,830,105, there is disclosed a temperature measuring device of the four wire connecting type, having a tape-like platinum resistance wire having a cross section of approximately 0.003mm embedded in an enamel layer. This wire may be adjusted via a tuning link. The device is manufactured by placing the resistance wire on a first cover coat layer, and by coating and melting it into a second layer of cover coat. A window in the second layer is left over a measuring loop. Within the area of this window adjacent pieces of wire of the measuring loop may be bridged to form the adjusting link in accordance with a predetermined resistance of the measuring loop. After this procedure the window is covered with at least one additional layer of cover coat which is then melted. Such temperature measuring devices have proven to work well under operating conditions when using a four wire connection.

A two-line connection, on the other hand, has generally been found to be unsatisfactory, since the feed lines embedded along an enameled pipe or similar equipment cause an additional, temperature dependent resistance of approximately 10 ohms per meter, thereby preventing reliable temperature measurement. On the other hand the use of feed lines having a considerably larger diameter is generally not possible for reasons of enameling technology. Furthermore, the embedding of relatively long resistance wire and feed lines necessitates very careful work since the mechanical stress to which the lines are subjected is the greater the longer the lines are.

It is therefore the purpose of this invention to improve a temperature measuring device as described above, largely avoiding the described drawbacks and difficulties, so that the formation of a window and creation of a tuning link are not necessary. The resulting two-line connection has a measuring accuracy which is comparable with that achieved with the phantom connection.

SUMMARY OF THE INVENTION

A temperature measuring device has a steel body in the form of a truncated cone with a stem. Feed lines are insulatively carried through the stem and core reaching the base of the cone where they make electrical contact to a measuring loop. The loop, which may be platinum tape, is enameled above the base. The thickness of the enamel between the steel base and the loop is preferably thicker than the enamel above the loop. As a further feature the steel base may have a depression to aid the application of the enamel. Preferably the feed lines are of greater cross sectional area than the measuring loop.

BRIEF DESCRIPTION OF THE DRAWING

The single FIGURE shows a cross-section through a measuring probe according to this invention, which was inserted into a correspondingly formed enameled opening in a steel wall prior to being embedded in the enamel.

DETAILED DESCRIPTION OF THE INVENTION

In the illustrated example, a truncated steel cone 1 is provided with a shaft part axially extending from the truncated end of the cone. The base surface of the cone faces the product to be measured. The base surface of the cone, its jacket surface and its shaft surface are all coated with a continuous enamel layer 2. A measuring loop 3 is embedded in the enamel layer on the base surface of the steel cone. This measuring loop consists of a tape-like resistance wire, preferably of an applied or vapor deposited meandering platinum layer. Preferably the thickness of the enamel layer under the measuring loop 3 appropriately is a multiple of the thickness of the enamel layer above the measuring loop. By placing the measuring loop under the surface and above a particularly thick enamel layer very short response times result. This is because the thermal transfer resistance between the product and the measuring loop is relatively small and is relatively large between measuring loop and the steel cone 1.

A channel 9 is formed along the axis of the steel cone 1 in which an insulating body 4 of ceramic material is arranged. Two feed lines 5 run through the insulated body and are connected with the respective end 3a and 3b of the measuring loop 3.

In the illustrated example a central indentation 8 is cut in the base surface of the steel cone 1 so that a particularly thick enamel layer can be applied under the measuring loop 3 without difficulty. Between the surface of the indentation 8 and the upper end of channel 9 two ducts 9a and 9b open into the channel, in which the feed lines 5 are embedded in enamel. In comparison with the cross section of the tape-like resistance wire of the measuring loop 3 the feed lines 5 may have a considerably larger diameter, so that the feed lines influence on the temperature measurement is negligible, particularly since the ends of the feed lines in the illustrated example are thermally well insulated, being embedded in the enamel between the ends of the measuring loop 3 and the upper end of the insulating body 4.

Such an enameled steel cone can be enamel embedded in an appropriaftely formed orifice in a steel wall 6 of a thermowell or a similar vessel part. Prior to installing the steel cone the equipment orifice is coated with an enamel layer 7. The illustrated example shows the enameled steel cone inserted into the orifice prior to being enameled in place.

Such an enameled steel body can be installed and embedded in essentially any chosen spot of an enameled unit. Since the base surface of the enameled steel cone can be placed in the horizontal position shown in FIG. 1 during its original manufacture as well as during the enameling process, a relatively thick enamel layer can be produced in this area without causing the enamel to flow during the firing process, so that the measuring loop 3 can be inserted at essentially any desired spot. The base surface of the enameled steel cone may have a diameter of a few centimeters so that it may also be embedded in the enamel of an enameled valve cock of a drain valve or in an internally enameled pipe.

Particular advantages of the invention are to be seen in the fact that the use of a pre-fabricated steel cone with a resistance wire embedded in the enamel makes possible a storing of already tested measuring probes, which if required, may be embedded in enamel at essentially any desired spot, such as prior to applying the last cover coat of the respective equipment part. Furthermore, the relatively small measuring probes may be fired simultaneously in greater numbers. Improved response capacity may be produced with a relatively thick enamel layer under the resistance wire and a relatively thin enamel layer above the resistance wire.

I claim:

1. A temperature measuring device suitable for measuring a product, said device comprised of:
   a steel body in the form of a truncated cone having a stem extending from the truncated end of the cone, said body having a channel axial through the stem into the cone;
   an insulating body within said channel;
   at least one duct extending from the channel to the base of the cone;
   at least two feed lines running through the channel and the duct to the base, said base for facing the product to be measured;
   a measuring loop in spaced relation to the base and electrically connecting the feed lines; and
   an enamel layer covering the cone surface and embedding the measuring loop.

2. The temperature measuring device of claim 1 wherein the enamel covering the base has a first layer between the measuring loop and the base and a second layer between the measuring loop and the product encountering surface of the device, said first layer being thicker than the second layer.

3. The device of claim 2 wherein the base has a central depression to aid in the application of said first layer.

4. The device of claim 2 wherein said measuring loop is a tape-like meandering platinum deposited on the first layer.

5. The device of claims 1, 2, 3 or 4 wherein said feed lines have a greater cross section area than the measuring loop.

6. The device of claims 1, 2, 3 or 4 where the feed lines are embedded in enamel within the duct.

* * * * *